H. J. McGIVERN.
FAUCET OR COCK.
APPLICATION FILED FEB. 27, 1914.
1,137,343.
Patented Apr. 27, 1915.
2 SHEETS—SHEET 1.
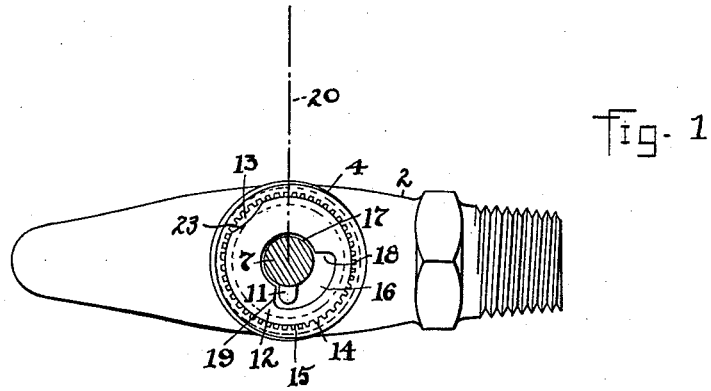
Fig. 1
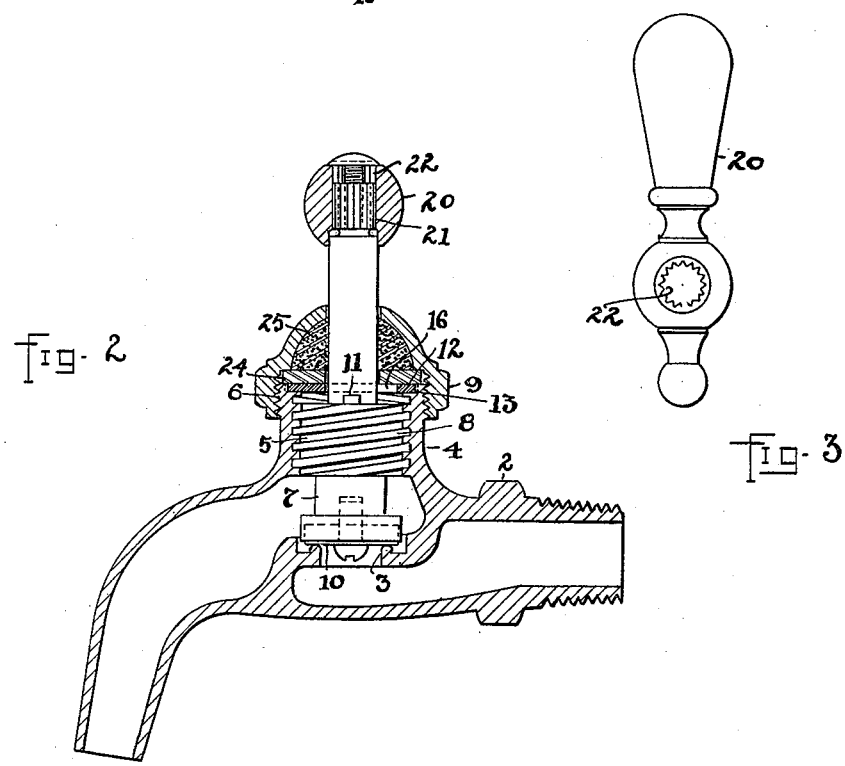
Fig. 2
Fig. 3
Witnesses
Inventor
Hugh J. McGivern
by
Fisher & Moert
Att'ys H. J. McGIVERN.
FAUCET OR COCK.
APPLICATION FILED FEB. 27, 1914.
1,137,343.
Patented Apr. 27, 1915.
2 SHEETS—SHEET 2.
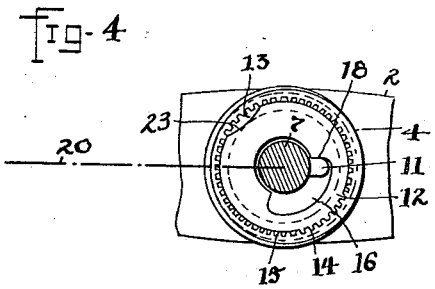
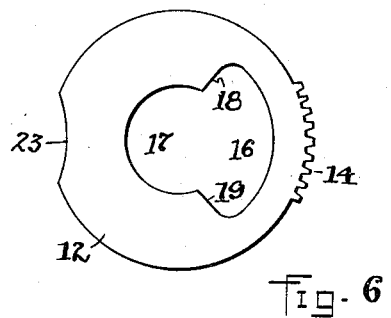
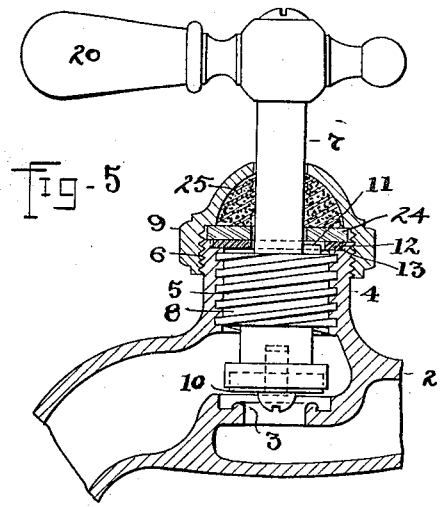
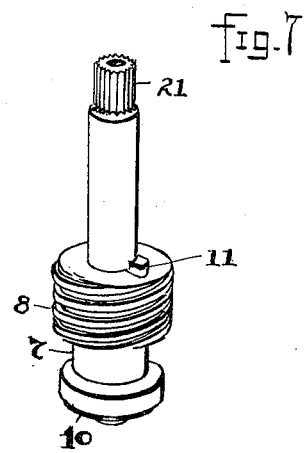
Witnesses
Duston Kimble
F. C. Harrold
Inventor
Hugh J. McGivern
by
Fisher & Moett
Attys

UNITED STATES PATENT OFFICE.

HUGH J. McGIVERN, OF CLEVELAND, OHIO, ASSIGNOR TO UNITED BRASS MANUFACTURING COMPANY, A COPARTNERSHIP COMPOSED OF WILLIAM J. SCHOENBERGER AND BENJAMIN F. KLEIN, ALL OF CLEVELAND, OHIO.

FAUCET OR COCK.

1,137,343.         Specification of Letters Patent.     Patented Apr. 27, 1915.

Application filed February 27, 1914. Serial No. 821,378.

*To all whom it may concern:*

Be it known that I, HUGH J. McGIVERN, citizen of the United States, residing at Cleveland, in the county of Cuyahoga and State of Ohio, have invented certain new and useful Improvements in Faucets or Cocks, of which the following is a specification.

This invention relates to faucets and cocks and particularly cocks of the quick compression kind wherein the valve stem is preferably limited to substantially a quarter turn in opening and closing the valve, and the invention resides in a simple and novel arrangement of parts for adjustably fixing the limit of movement of the valve stem, substantially as hereinafter shown and described and more particularly pointed out in the claims.

In the accompanying drawings, Figure 1 is a plan view of a cock embodying my invention, the valve stem being shown in section and the cap nut being removed. Fig. 2 is a sectional view centrally through the cock showing the valve stem in side elevation and the valve seated and closed. Fig. 3 is a plan view of the handle alone. Figs. 4 and 5 are plan and section views corresponding to Figs. 1 and 2, but showing the valve open. Fig. 6 is an enlarged face view of the adjustable stop washer. Fig. 7 is a perspective view of the valve and its stem.

As shown, the faucet or cock comprises a body 2 having a valve seat 3 and a tubular neck 4 opposite thereto which is provided with square multiple threads 5 internally and V threads 6 externally. A valve stem 7 has a threaded enlargement 8 engaged with threads 5, and the reduced upper end of the stem projects through a cap nut 9 which is screw-engaged with threads 6. A fiber or rubber washer 10 is removably affixed to the bottom of the valve stem to engage seat 3 which obviously fixes the limit of axial movement of the valve in this direction. The movement of the valve stem in the opposite direction or upwardly is fixed by a lug 11 on the stem and a metal disk 12 removably mounted in an annular recess 13 in the upper end of neck 4. A variation in movement of the stem, both rotative and axial, is obtained by a rotatable shift in position of disk 12 in its recess, and a fixed setting in a fine degree is obtained by employing a few fine teeth 14 on the edge of disk 12 and an endless row of teeth 15 in the circumferential wall of the recess 13. A segmental opening 16 in the disk adjacent to its central opening 17 for the stem affords a stop shoulder 18 radially of the disk for the lug 11, and the radial position of this shoulder determines the degree of rotative movement of the stem and also the open position of the valve handle. Lug 11 is relatively short so that it may drop beneath the bottom face of the disk and not strike the other shoulder 19 of the opening 16 when the reverse or closing movement of the valve is brought about, and consequently the valve may be tightly seated at all times regardless of wear on the fiber washer. When the valve is seated it is desirable to have the valve handle 20 in squared relation or at right angles to the body of the cock, either to the right or left dependent upon conditions or requirements of any particular installation. Such relations are difficult to establish in the manufacture of the cocks, as a slight variation in the lead entrance of the thread or a variation in thickness of the seating washer or the length of the stem or in cutting the seat will produce a corresponding variation in the setting of the handle. Therefore, the handle is made a separate and adjustable part of the stem, the upper end 21 of the stem being serrated and the bore 22 of the handle being provided with corresponding serrations or teeth to permit independent adjustment of the handle upon the stem. A similar adjustment to fix the stop limit in opening the valve is afforded by the disk 12, but the degree of adjustment is finer in that the number of teeth in the recess 13 are more numerous, and the rotation of the stem in opening the valve may be limited a quarter turn, or a greater or lesser degree of rotation than that may be obtained if desired by shifting the disk 12 rotarily for this purpose. Where a wide range of adjustment is desirable a wider space would be allowed between the disk 12 and the upper face of the threaded enlargement 8 than as shown.

The top face of the disk 12 is flush with the top of neck 4, and difficult to remove when seated. Therefore, the disk is provided with an escalloped or curved indenture 23 in its border to facilitate the removal of the disk from its recess, either by hand or tool. The construction of the disk also permits it to be used with either of its flat faces up which obviates any possibility of mistake in assemblying the parts, and as both faces of the disk are flat either face affords a suitable seating surface for the fiber sealing washer 24 beneath the packing material 25 within the cap nut 9, whereby the joint between the cap nut and the neck 4 will be covered and sealed.

What I claim is:

1. In a faucet or cock a tubular neck having an annular recess with serrations in its side, a rotatable and axially movable valve having a stem provided with a stop, adjustable means to limit the movement of said valve and stem comprising a flat disk having a shoulder radially thereof between its flat faces to coöperate with said stop and provided with teeth for engaging said serrations and a curved indenture in its border.

2. In a faucet or cock, a body portion having a serrated recess, a rotatable and axially movable valve having a fixed stop member thereon, and a disk having a segmental opening of substantially quadrant shape therein forming a shoulder for engagement by said stop member and provided with a series of teeth at its border adjacent said opening, said disk being removably seated within said serrated recess.

3. In a faucet or cock a body portion having a serrated recess, a valve stem having a lug, and a stop member for said stem comprising a disk having an opening therein forming shoulders for said lug and provided with serrations for engaging the serrations in said recess and an escalloped border.

4. In a faucet or cock, a body having a tubular neck provided with screw threads and radial serrations, a valve and a threaded stem therefor having a stop projection, a removable rotatably-adjustable disk having a toothed border engaged with said serrations and an indenture in said border and provided with a stop shoulder to co-act with said stop projection, and a cap nut to secure said disk in place.

In testimony whereof I affix my signature in presence of two witnesses.

HUGH J. McGIVERN.

Witnesses:
WM. S. VALMORE,
M. FITZGERALD.

Copies of this patent may be obtained for five cents each, by addressing the "Commissioner of Patents, Washington, D. C."